United States Patent
Kuo et al.

(10) Patent No.: US 9,703,318 B2
(45) Date of Patent: Jul. 11, 2017

(54) SURROUNDING MEMBER WITH COVERING STRUCTURE, ELECTRONIC DEVICE HAVING THE SURROUNDING MEMBER WITH COVERING STRUCTURE, AND METHOD OF ASSEMBLING THE SURROUNDING MEMBER WITH COVERING STRUCTURE

(71) Applicant: Wistron Corporation, New Taipei (TW)

(72) Inventors: Chun-Hong Kuo, New Taipei (TW); Yu-Wei Liu, New Taipei (TW); Feng-Wei Yang, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 0 days.

(21) Appl. No.: 14/979,632

(22) Filed: Dec. 28, 2015

(65) Prior Publication Data

US 2016/0316580 A1    Oct. 27, 2016

(30) Foreign Application Priority Data

Apr. 27, 2015   (TW) .............................. 104113413 A

(51) Int. Cl.
*H05K 7/02* (2006.01)
*H05K 7/04* (2006.01)
*G06F 1/16* (2006.01)

(52) U.S. Cl.
CPC .............. *G06F 1/16* (2013.01); *G06F 1/1601* (2013.01); *G06F 1/1626* (2013.01); *G06F 2200/1612* (2013.01); *G06F 2200/1631* (2013.01)

(58) Field of Classification Search
CPC ........ G06F 1/16; G06F 1/1601; G06F 1/1626; G06F 2200/1612; G06F 2200/1631
USPC ............... 361/679.01, 807, 809, 810, 679.32
See application file for complete search history.

(56) References Cited

U.S. PATENT DOCUMENTS

| 4,966,004 A * | 10/1990 | Midlang ............... F25D 29/005 |
| | | 200/302.2 |
| 5,936,835 A * | 8/1999 | Astier ..................... G06F 1/184 |
| | | 361/679.31 |
| 7,864,515 B2 | 1/2011 | Numata et al. |
| 8,248,791 B2 * | 8/2012 | Wang ..................... F16M 11/10 |
| | | 248/188.8 |
| 8,264,831 B2 * | 9/2012 | Hsieh ...................... G06F 1/185 |
| | | 16/368 |

(Continued)

*Primary Examiner* — Hung S Bui
(74) *Attorney, Agent, or Firm* — McClure, Qualey & Rodack, LLP

(57) ABSTRACT

A surrounding member with covering structure, an electronic device having the surrounding member, and a method of assembling a surrounding member are disclosed. A case of the electronic device includes a through hole. The surrounding member includes a first fastener, a second fastener, and a supporter. The first fastener passes through the through hole and is attached to the case. The second fastener and the supporter cover a lateral wall of the case. Therefore, the surrounding member can be assembled to the case even without using an adhesive and the surrounding member will not detach from the case easily. Moreover, because the surrounding member is attached to the case by passing through the though hole and cover the lateral wall of the case, the surrounding member is also adopt for an electronic device with narrow frame.

27 Claims, 12 Drawing Sheets

(56) References Cited

U.S. PATENT DOCUMENTS

2010/0271768 A1* 10/2010 Fan .................. G06F 1/186
                                                    361/679.4

* cited by examiner

SURROUNDING MEMBER WITH COVERING STRUCTURE, ELECTRONIC DEVICE HAVING THE SURROUNDING MEMBER WITH COVERING STRUCTURE, AND METHOD OF ASSEMBLING THE SURROUNDING MEMBER WITH COVERING STRUCTURE

CROSS-REFERENCES TO RELATED APPLICATIONS

This non-provisional application claims priority under 35 U.S.C. §119(a) on Patent Application No. 104113413 filed in Taiwan, R.O.C. on 2015, Apr. 27, the entire contents of which are hereby incorporated by reference.

BACKGROUND

Technical Field

The instant disclosure relates to a surrounding member with covering structure, in particular, relates to a surrounding member with covering structure adapted for an electronic device and a method of assembling the surrounding member with covering structure.

Related Art

Most of the AIO computers (All-In-One computers) have rubber pads fixed on the case of AIO computers to provide friction force that helps AIO computers sit on the desk and prevents from sliding. Therefore, the AIO computers can be adjusted for a suitable angle of view. The common design is to adhere the rubber pad directly on the case of the AIO computer. However, the adhered rubber pads often detach from the case caused by the long-term fiction between the desk and the rubber pad. Alternatively, the adhered rubber pads may detach from the case if the user constantly adjusts the view angle by forwardly or backwardly pushing the case which causes forces with different directions against the rubber pads. Moreover, the adhesive would be aged if the adhesive is placed in an environment with large temperature-cycling for a long time and the adhered rubber pad would detach from the case.

In order to solve this problem, increasing the adhering area between the rubber pads and the case is utilized to enhance the adhesive force. However, the effect of increasing the adhering area of the pads is limited to the width of the frame of AOIs, especially the electronic device with narrow frame. Alternatively, double plastic injection mold is used to produce the pad. Specifically, the pad includes a harder material like plastic and a less harder material like rubber. The dual material pads provide harder hardness and higher friction against deformation. However, the production cost of the dual material pads is more expensive.

SUMMARY

According to an embodiment of the instant disclosure, an electronic device comprises a case, at least one surrounding member with covering structure (to be referred to as the surrounding member hereinafter). The case comprises a back cover. The back cover comprises a base board and at least one lateral wall connected to the base board. The base board has at least one through hole near the joining region of the base board and the lateral wall. The surrounding member is disposed on the case and comprises a first fastener, a second fastener, and a supporter. The first fastener and the second fastener are, respectively, disposed on two ends of the supporter. The first fastener passes through the through hole of the base board and is attached on the base board. The supporter and the first fastener cover the base board, and the supporter and the second fastener cover the lateral wall.

According to an embodiment of the instant disclosure, a method of assembling a surrounding member comprises the following steps. First, provide a case and at least one surrounding member. The case comprises a back cover. The back cover comprises a base board and at least one lateral wall connected to the base board. The base board has at least one through hole near the joining region of the base board and the lateral wall. The surrounding member is disposed on the case and comprises a first fastener, a second fastener, and a supporter. The first fastener and the second fastener are disposed on two ends of the supporter.

Next, pass the first fastener of the surrounding member through the through hole of the base board along the direction parallel to the lateral wall until the supporter abuts the base board. Then, rotate the supporter so that the supporter and the first fastener cover the base board, and the supporter and the second fastener cover the lateral wall. After finishing above steps, provide a front cover and secure the front cover to the back cover correspondingly such that the front cover is pressed against the second fastener of the surrounding member. Therefore, the surrounding member is assembled to the case of the electronic device.

According to an embodiment of the instant disclosure, a surrounding member comprises a supporter, a first fastener, and a second fastener. The supporter comprises a first inner surface and a second inner surface. The first inner surface is connected to the second inner surface. The first fastener comprises a restricting portion and a receiving portion. One end of the receiving portion is connected to the first inner surface of the supporter, and another end of the receiving portion is connected to the restricting portion, and the restricting portion extends toward the direction away from the second inner surface. The second fastener is disposed on the second inner surface of the supporter.

In summary, the surrounding member, attached to the case of the electronic device through two fasteners not only using adhesives, is used as a pad. The surrounding member can be fixed on and wrapped around the electronic device in addition to cover it. Under normal condition, the surrounding member is not easy to detach from the case of the electronic device, especially, is used in the electronic device with narrow frame. Since the surrounding member covers the case, the surrounding member can be secured on case firmly and the surrounding member does not easily detach from the electronic device with narrow frame by the less adherable area. In addition, in order to make the product appearance beautiful, an adhesive tape may be utilized to additional adhere the surrounding member on case.

DETAILED DESCRIPTION

Figure 1:
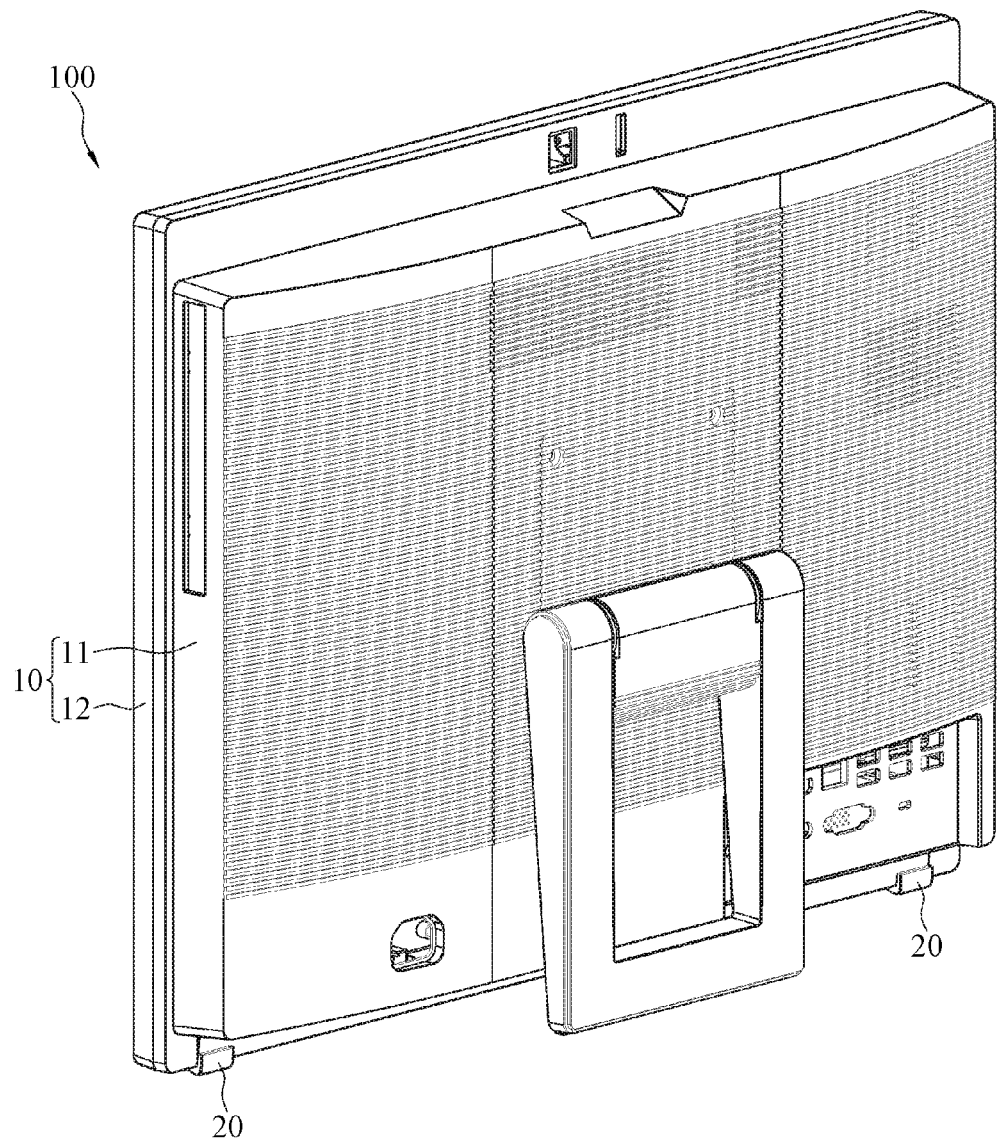
FIG. 1 illustrates a schematic diagram of an electronic device having a surrounding member with covering structure according to one embodiment of the instant disclosure.
Figure 2:
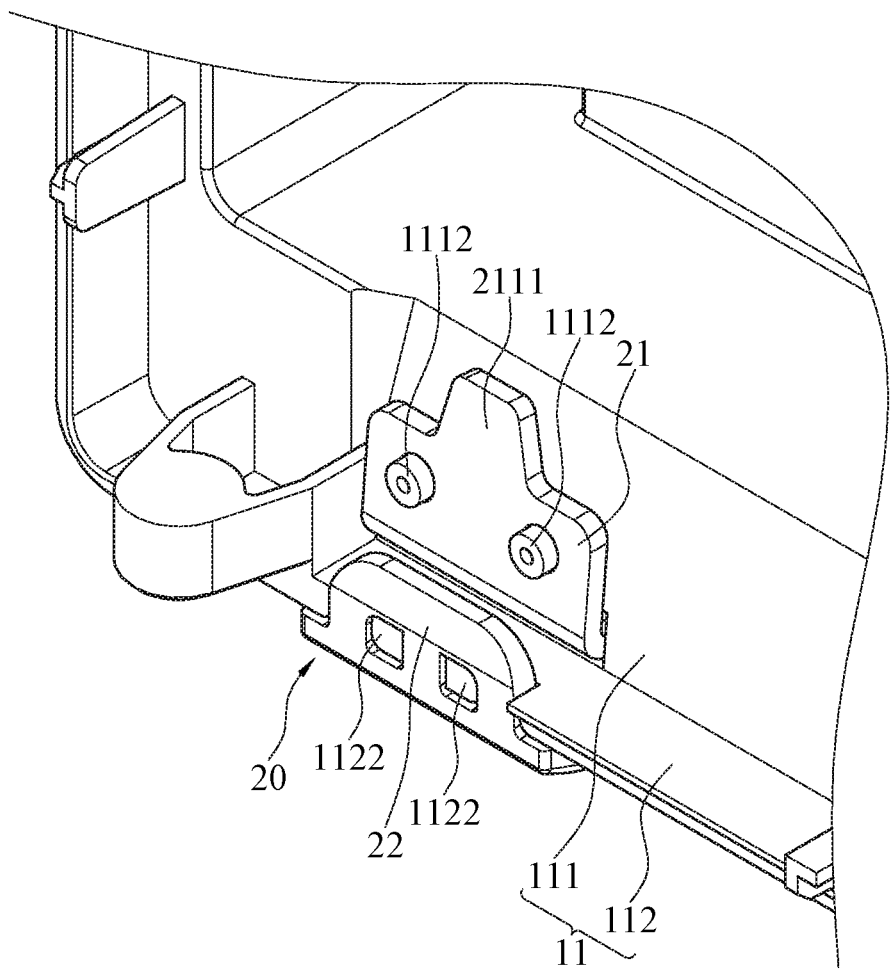
FIG. 2 illustrates a partial schematic diagram of an electronic device having a surrounding member with covering structure according to one embodiment of the instant disclosure.
Figure 3:
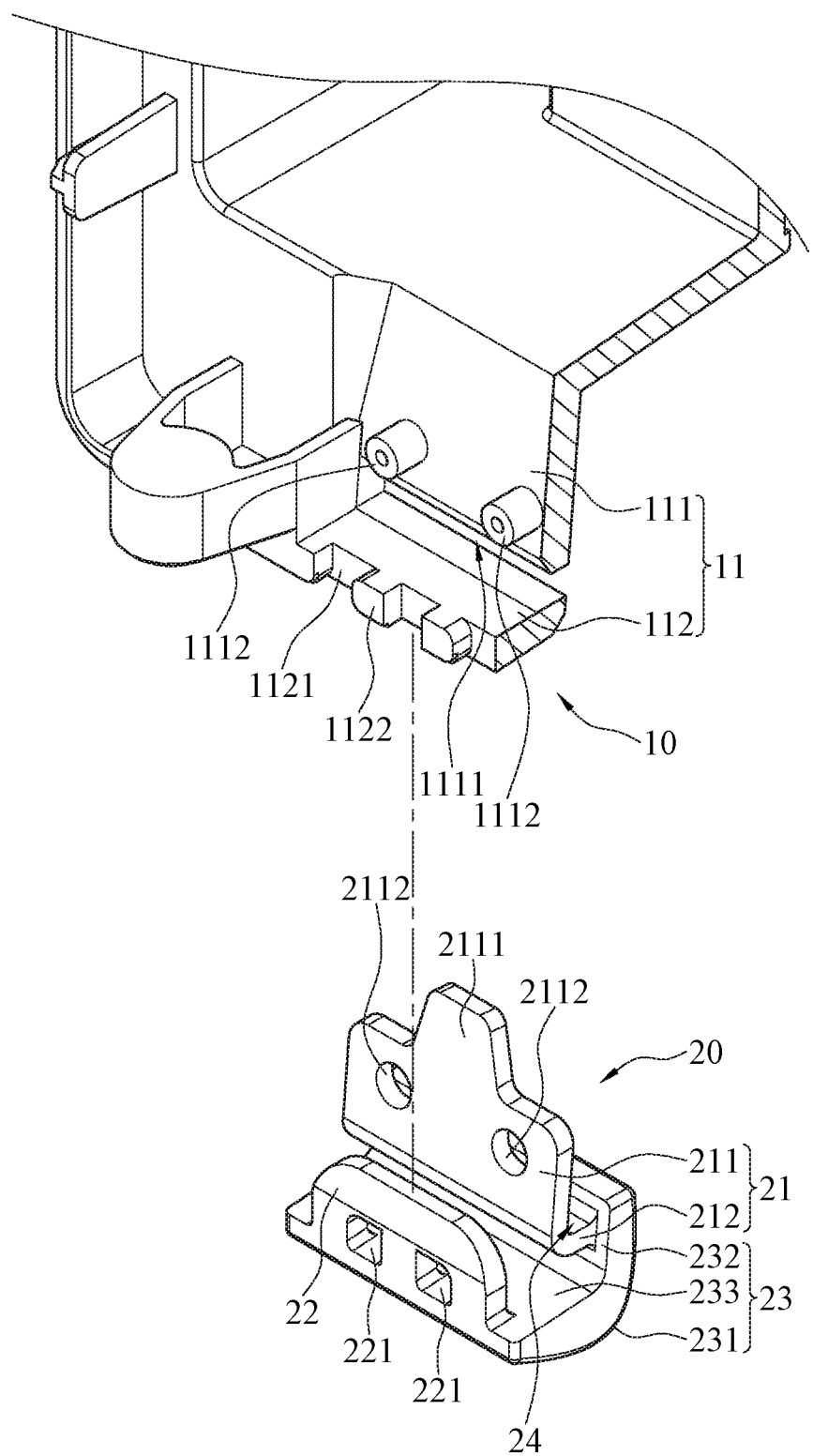
FIG. 3 illustrates a partial exploded view diagram of an electronic device having a surrounding member with covering structure according to one embodiment of the instant disclosure.
Figure 4:
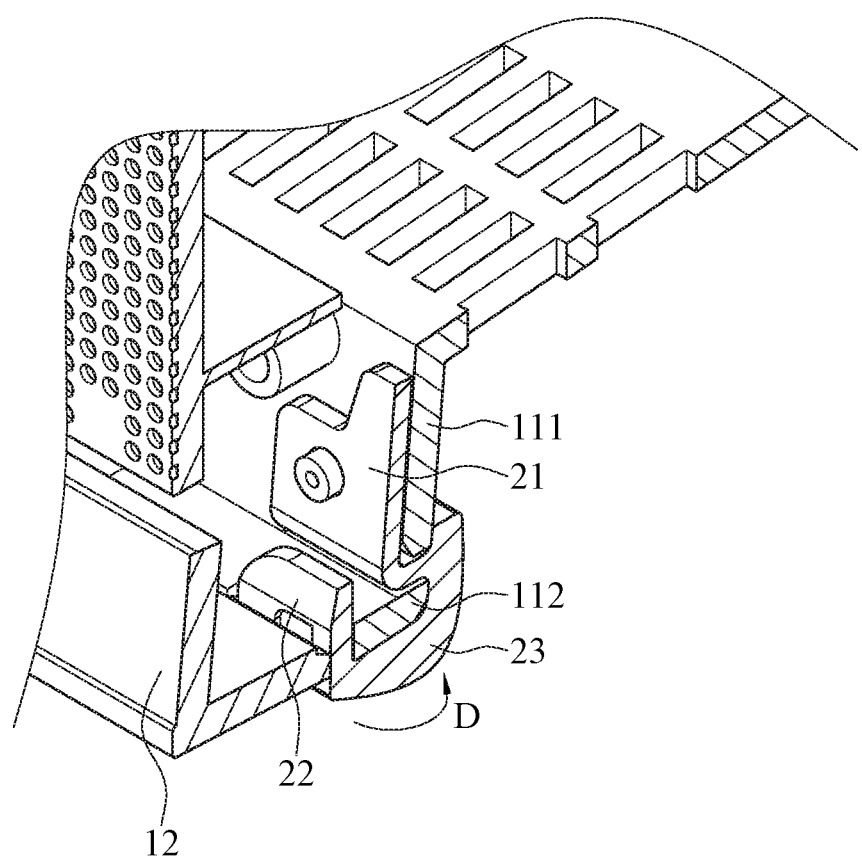
FIG. 4 illustrates a partial perspective cross-sectional view of an electronic device having a surrounding member with covering structure according to one embodiment of the instant disclosure.
Figure 5:
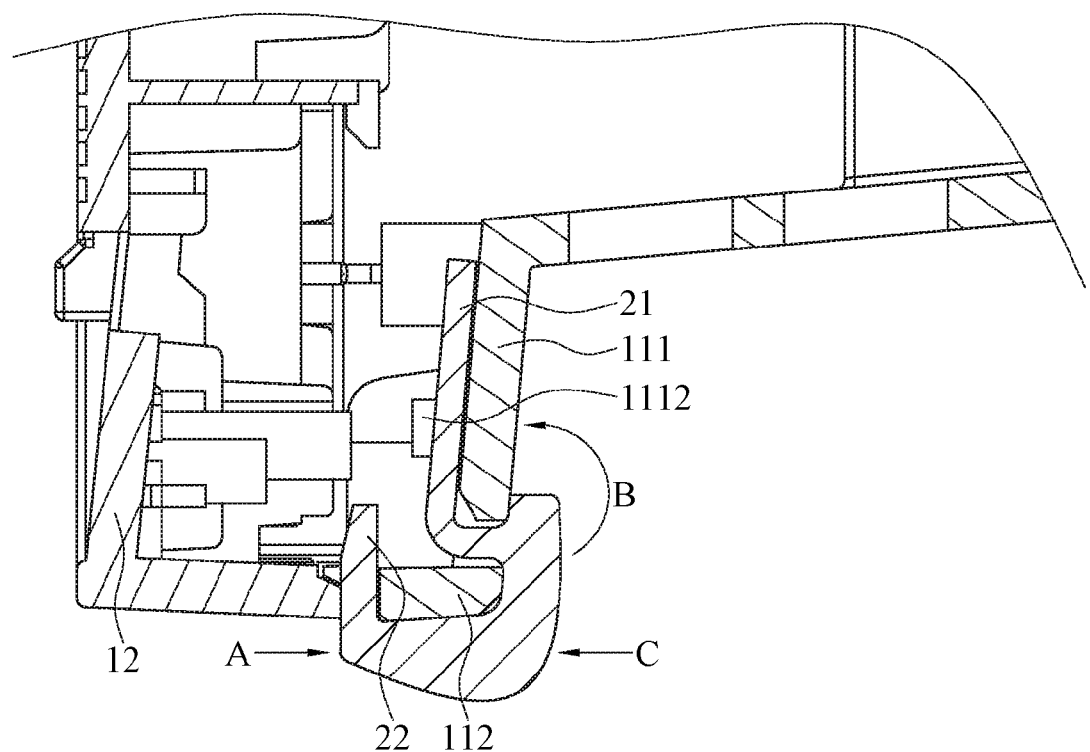
FIG. 5 illustrates a partial cross-sectional view of an electronic device having a surrounding member with covering structure according to one embodiment of the instant disclosure.

Please refer to FIGS. 1 to 5, these figures illustrate the same embodiment of the electronic device. FIG. 1 illustrates a schematic diagram of an electronic device having a surrounding member with covering structure according to one embodiment of the instant disclosure. FIG. 2 illustrates a partial schematic diagram of an electronic device having a surrounding member with covering structure according to one embodiment of the instant disclosure. FIG. 3 illustrates a partial exploded view diagram of an electronic device having a surrounding member with covering structure according to one embodiment of the instant disclosure. FIG. 4 illustrates a partial perspective cross-sectional view of an electronic device having a surrounding member with covering structure according to one embodiment of the instant disclosure. FIG. 5 illustrates a partial cross-sectional view of an electronic device having a surrounding member with covering structure according to one embodiment of the instant disclosure. In this embodiment, the electronic device 100 comprises a case 10 and two surrounding members with covering structure 20 (to be referred to as the surrounding member hereinafter). However, in practice, the amount of the surrounding member 20 can be one or more than two, and the amount of the surrounding members 20 is merely provided for illustration, without any intention to be used for limiting the instant disclosure. Beside, as shown in FIG. 1, the surrounding members 20 are disposed on two sides of the bottom of the electronic device 100. Therefore, when the electronic device 100 is put on a table, the surrounding members 20 can be used to support pads by providing necessary friction force for the electronic device 100.

The case 10 comprises a back cover 11 and a front cover 12. The back cover 11 comprises a base board 111 and four lateral walls 112. The lateral walls 112 are perpendicular to the base board 111 and are disposed around the base board 111 so as to form the back cover 11 which can accommodate the electronic element. The base board 111 has two through holes 1111 near the joining region of the base board 111 and the lateral walls 112 (only one through hole 1111 is shown in the figures). As shown in FIGS. 2 and 3, since the surrounding members 20 are disposed the on bottom of the electronic device 100, the through holes 1111 passing through the base board 111 are correspondingly located at the lower part of the base board 111 (shown in FIG. 3) and are disposed near the joining region of the base board 111 and the lateral wall 112. Beside, the lateral wall 112 has at least one recess portions 1121 corresponding to the through holes 1111.

Figure 6:
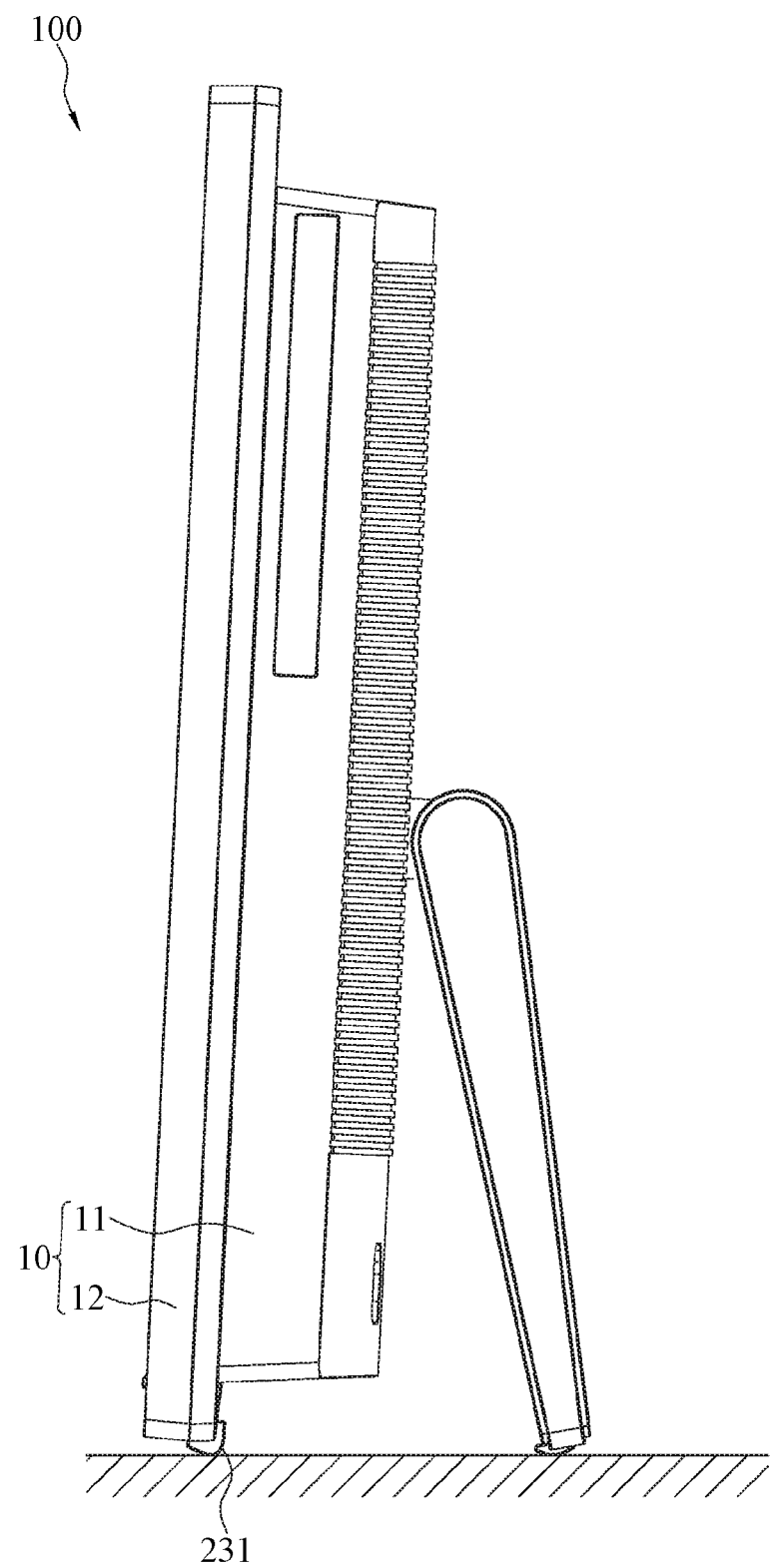
FIG. 6 is a use state diagram of an electronic device having a surrounding member with covering structure.
Figure 7:
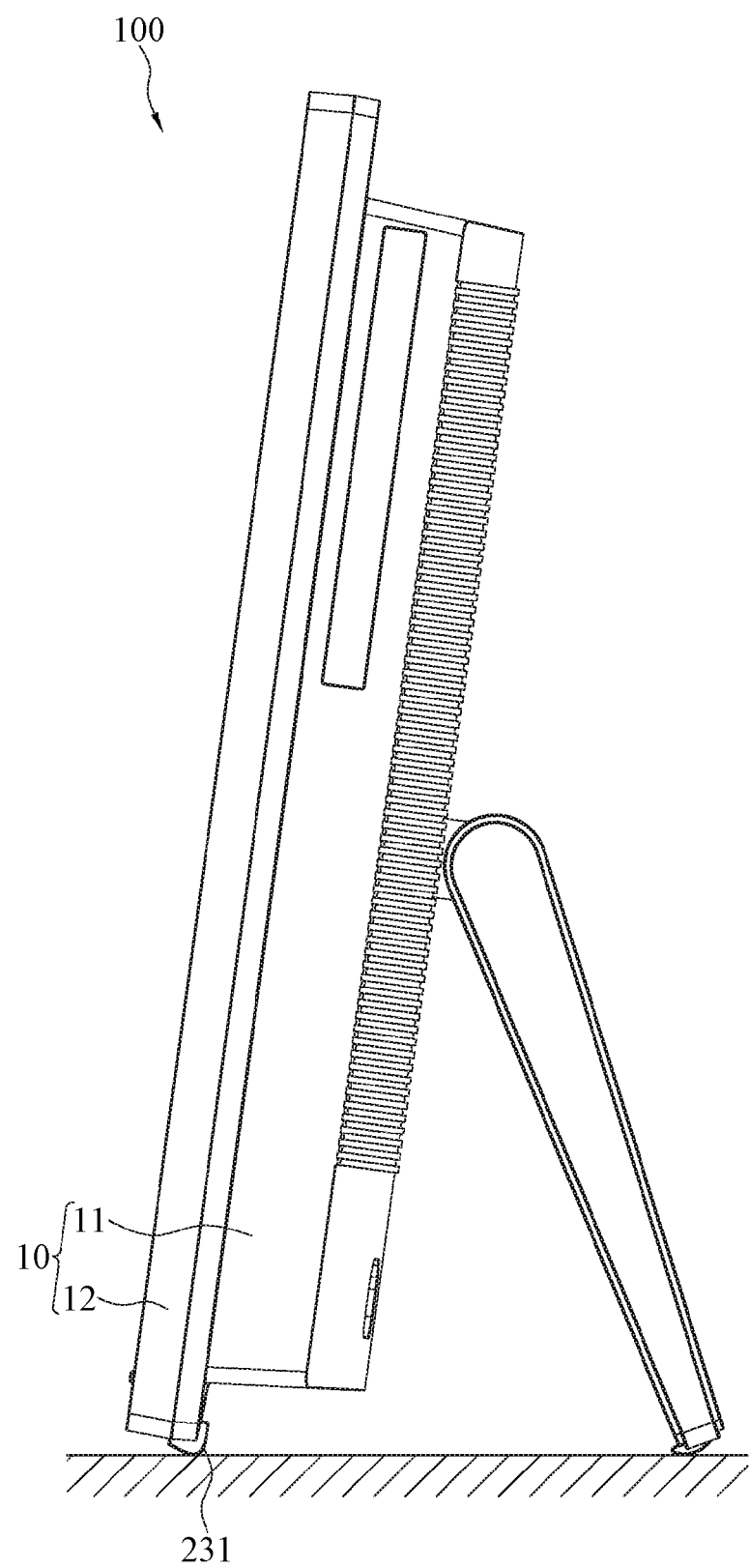
FIG. 7 is a use state diagram of an electronic device having a surrounding member with covering structure.

Each of the surrounding members 20 comprises a first fastener 21, a second fastener 22, and a supporter 23. The supporter 23 is roughly L-shaped and comprises an inner surface and an external surface 231. The inner surface comprises a first inner surface 232 and a second inner surface 233, and the first inner surface 232 is perpendicular to the second inner surface 233. A thickness of the supporter 23 exists between the external surface 231 and inner surface. The external surface 231 of the supporter 23 defines a L-shaped corner area, and the L-shaped corner area has a curved contour for supporting. As shown in FIGS. 6 and 7, these figures are a use state diagram of the electronic device 100 adjusted at different standing angles. As shown in FIGS. 6 and 7, since the supporter 23 comprises external surface 231, which has the curved contour, the standing angle of the electronic device 100 can be adjusted arbitrarily. The external surface 231 can against the table but will not be limited to specific angle merely for standing.

Please refer to FIG. 3 again. The first fastener 21 comprises a restricting portion 211 and a receiving portion 212. In this embodiment, one end of the receiving portion 212 is connected to and perpendicular to the first inner surface 232 of the supporter 23. Another end of the receiving portion 212 is connected to the restricting portion 211, and the restricting portion 211 extends toward the direction away from the second inner surface 233. Please refer to FIGS. 3 to 5 again. The restricting portion 211, the receiving portion 212, and the supporter 23 form a covering groove 24. When the surrounding members 20 are disposed on the back cover 11, the restricting portion 211 of the first fastener 21 flatly contacts with the base board 111 and the bottom width of the covering groove 24 formed by the receiving portion 212 is approximately equal to the width of the base board 111. When the covering groove 24 covers the one side of the base board 111 near upper side of the through holes 1111, the supporter 23 is exactly against the other side of the base board 111 opposite to the side flatly contacting with the restricting portion 211. Therefore, the first fastener 21 and the supporter 23 cover the base board 111 so as to make the appearance of the electronic device 100 pithy and provide partial supporting and fixing force to hold the electronic device 100.

For example, please refer to FIGS. 3 to 5 again. Once the surrounding members 20 are forced in the direction of arrow A, then the surrounding members 20 exerts reaction force in the direction of arrow B. Since the supporter 23 is against the base board 111, the receiving portion 212 does not be forced so as to prevent the receiving portion 212 from breaking. Besides, the restricting portion 211 and the first inner surface 232 of the supporter 23 jointly clip the two opposite sides of the base board 111 and provide an attach and position function for the surrounding members 20.

Please refer to FIG. 3 again. The restricting portion 211 is a rectangle article. In order to increase the convenience of assembling the surrounding member 20 on the electronic device 100, a gripping portion 2111 can extend from the restricting portion 211. The restricting portion 211 may be attached on the base board 111 by coating an adhesive or screwing. In this embodiment, two first protruding pillars are protrudingly disposed near the through hole 1111 of the base board 111, and two first positioned holes 2112 passes through the restricting portion 211. When the restricting portion 211 flatly contacts with the base board 111, the first protruding pillars 1112 correspondingly passes through the first positioned holes 2112 so that the restricting portion 211 is attached on the base board 111. Therefore, as shown in FIG. 2, the restricting portion 211 is attached on the base board 111 even without using the adhesive. The amounts of the first protruding pillars 1112 and the first positioned holes 2112 can be one or more than one, however, the amount of the first protruding pillars 1112 and the first positioned holes 2112 are merely provided for illustration, without any intention to be used for limiting the instant disclosure.

The second fastener 22 is disposed on the second inner surface 233 of the supporter 23. As sown in FIG. 5, the second fastener 22 extends upwardly as illustrated in FIG. 5, and the second fastener 22 and first fastener 21 extend toward the same direction. As sown in FIGS. 3 and 4, the second fastener 22 is accommodated in the recess portion 1121 of the lateral wall 112. In this embodiment, in order to make the edge of the back cover 11 flat, the depth of the recess portion 1121 can be the same as the thickness of the second fastener 22 so that the second fastener 22 is completely disposed within the recessed portion 1121 without projecting out of the edge of lateral wall 112. In other embodiment, the thickness of the second fastener 22 can be slightly larger than the depth of the recess portion 1121. When the front cover 12 is secured on the back cover 11, the front cover 12 is pressed against the second fastener 22. The front cover 12 and the back cover 11 can provide a clamping force for the second fastener 22.

The second fastener 22 is accommodated in the recess portion 1121, the second fastener 22 can be attached to the recess portion 1121 through an adhesive. In this embodiment, two second protruding pillars 1122 are protrudingly disposed in the recess portion 1121, and two second positioned holes 221 passes through the second fastener 22. When the second fastener 22 is disposed within the recess portion 1121, two second protruding pillars 1122 correspondingly pass through two second positioned holes 221 to attach to the second fastener 22. However, the amounts of the second protruding pillars 1122 and the second positioned holes 221 are merely provided for illustration, and the amounts can be one or more than two, without any intention to be used for limiting the instant disclosure.

As sown in FIGS. 2, 4, and 5, when the surrounding members 20 are disposed on the back cover 11, the second fastener 22 and the supporter 23 cover the lateral wall 112 so that the surrounding members 20 can be clipped and attached to the lateral wall 112. The first inner surface and the second inner surface 233 of the supporter 23 can be coat an adhesive so that the supporter 23 can be attached to the lateral wall 112. When two surrounding members 20 are disposed on the back cover 11 and the front cover 12 is correspondingly secured on the back cover 11, the front cover 12 is pressed against the second fasteners 22 of the surrounding members 20 and the second protruding pillars 1122, as shown in FIG. 4.

When adjusting the standing angle of the electronic device 100 by applying a force in the direction of arrow A as illustrated in FIG. 5, the second fasteners 22 of the surrounding members 20 sustain the clamping force from the front cover 12 and the back cover 11. Since the second fasteners 22 sustains the above-mentioned clamping force and the second protruding pillars 1122 correspondingly pass through and secured in the second positioned holes 221, the force in the direction opposite to the arrow A is produced. Therefore, the surrounding members 20 will not detach from the electronic device 100. The supporter 23 will not be moved or detached and provide supporting force even if the supporter 23 does not adhere to the lateral wall 112 through an adhesive.

When the surrounding members 20 are forced in the direction of arrow C as illustrated in FIG. 5, since the first fasteners 21 is attached to the base board 111, the supporter 23 does not detach from the back cover 11. And the supporter 23 is attached to the lateral wall 112 through the first fasteners 21 and the second fasteners 22. Therefore, the supporter 23 will not be moved or detached form case 10 even if the supporter 23 does not adhere to the lateral wall 112 through an adhesive for a long time. In addition, when the surrounding member 20 sustains a rotating force (arrow A or arrow C as illustrated in FIG. 5) by rotating the electronic device 100 along the desktop, the first fasteners 21 and the second fasteners 22 provides fixing force for the supporter 23 so that the supporter 23 will not be moved or detached form case 10.

With the above structure, no matter how to adjust the standing angle of the electronic device 100 and how to rotate or move the position of the electronic device 100, the surrounding member 20 does not be moved or detached form case 10 because of the fixing function of the first fasteners 21 and the second fasteners 22. Since the main attachment between the surrounding member 20 and the case 10 is not provided by the adhesive, even the electronic device 100 is used repeatedly in an environment with large temperature-cycling for a long time, the surrounding member 20 does not detached from the case 10. In addition, since the supporter 23 comprises external surface 231, which has the curved contour, the standing angle of the electronic device 100 can be adjusted easily in specific angle ranges to make the external surface 231 linearly or facially contact with the table to provide a prefer supporting force and friction force.

Figure 8:
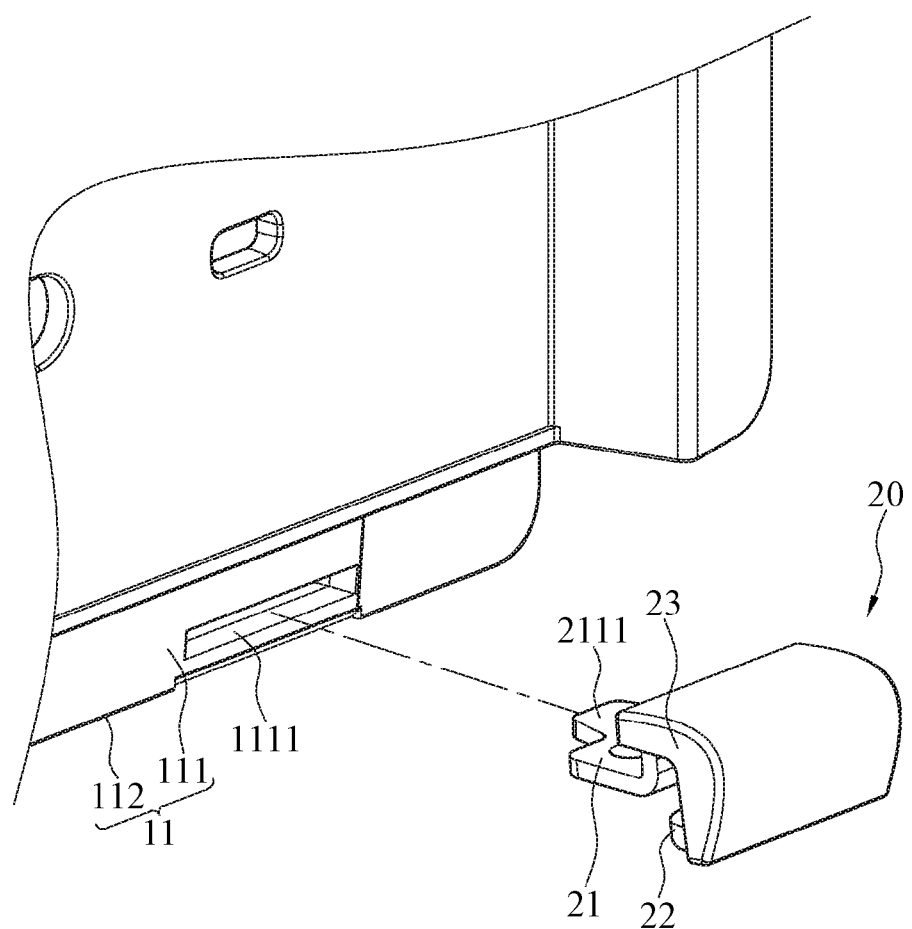
FIGS. 8-10 are schematic diagrams each illustrating steps of a method of assembling a surrounding member with covering structure according to one embodiment of the instant disclosure.
Figure 9:
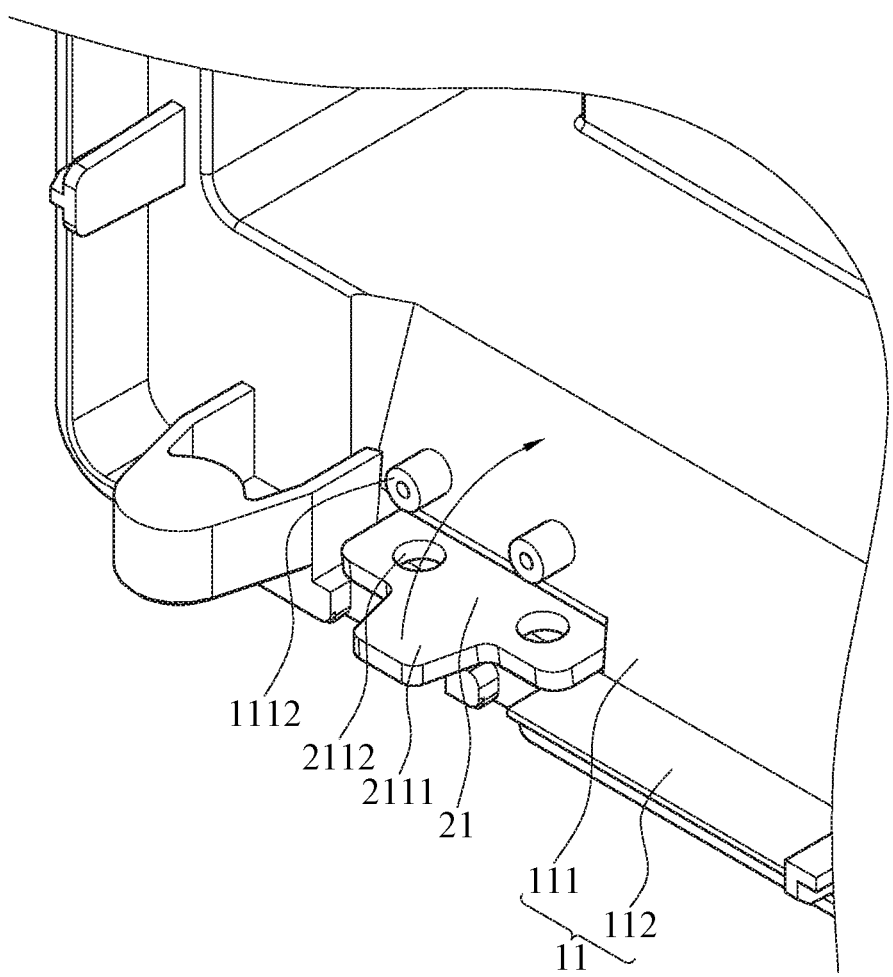
Figure 10:
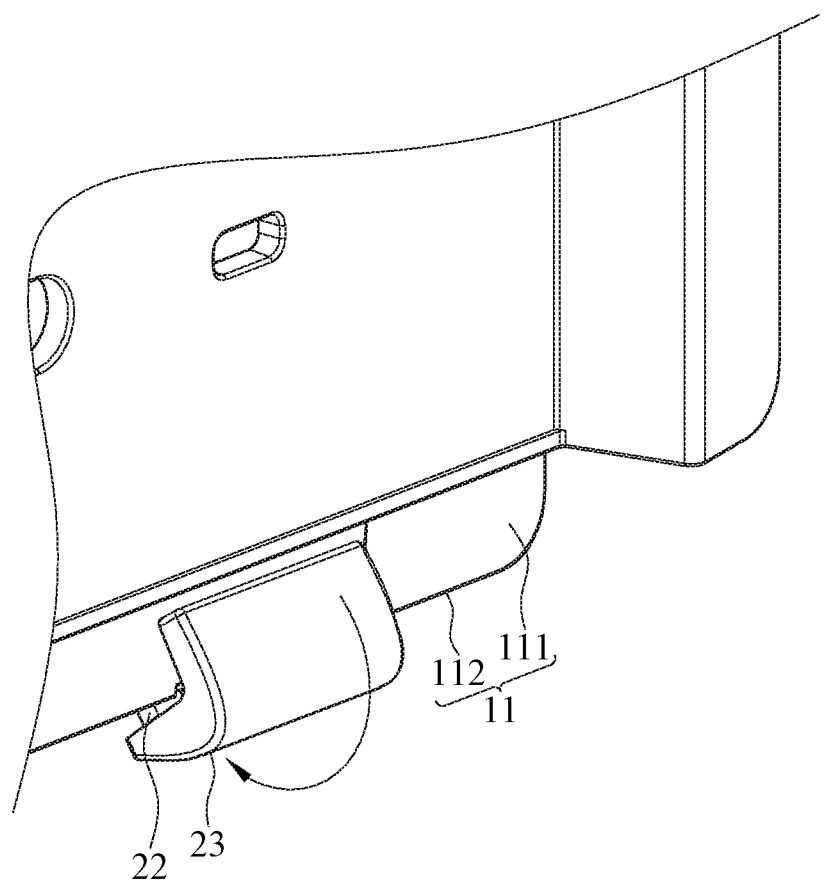
Figure 11:
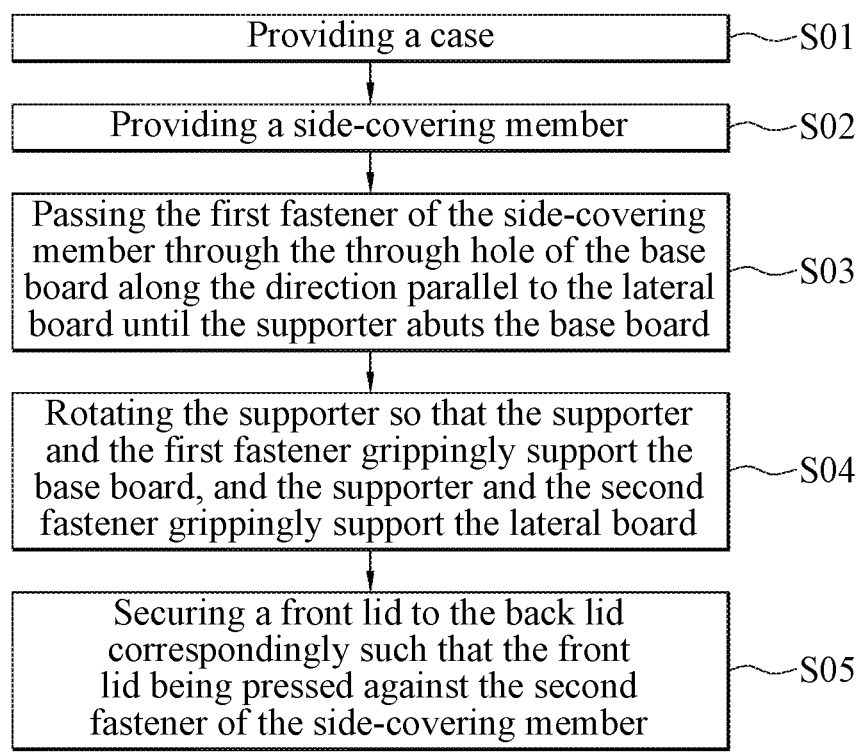
FIG. 11 is a flow chart illustrating a method of assembling a surrounding member with covering structure according to one embodiment of the instant disclosure.

Please refer to FIGS. 2, 4, 8 and 11. FIGS. 8 to 10 are schematic diagrams each illustrating a step of a method of assembling a surrounding member according to one embodiment of the instant disclosure. FIG. 11 is a flow chart illustrating a method of assembling a surrounding member according to one embodiment of the instant disclosure. The step S01 is providing the case 10, and the step S02 is providing a surrounding member 20. The detailed description of case 10 and the surrounding member 20 refer to the foregoing description, and the common features are not described again. When assembling the surrounding member 20 to the electronic device 100, the first fastener 21 of the surrounding member 20 is passed through the through hole 1111 of the base board 111 along the direction parallel to the lateral wall 112 until the supporter 23 abuts the base board 111 (step S03). As shown in FIG. 6, the first fastener 21 of the surrounding member 20 is passed through the through hole 1111 of the base board 111 along the direction parallel to the lateral wall 112 and the surrounding member 20 is pushed until the supporter 23 abuts the base board 111 (step S03). The way pushing the surrounding member 20 until the supporter 23 abuts the base board 111 can be holding the supporter 23 and pushing it forward (as illustrated in FIG. 9), or by grabbing the gripping portion 2111 and pulling it toward the direction away from the back cover 11 (as illustrated in FIG. 7).

Next, as shown in FIG. 10, rotating the supporter 23 so that the supporter 23 and the first fastener 21 cover the base board 111, and the supporter 23 and the second fastener 22 cover the lateral wall 112 (step S04) and the second fastener 22 is accommodated in the recess portion 1121, as shown in FIG. 2. When rotating the supporter 23 accompanied by the rotation of the first fastener 21 until the first fastener 21 against to the base board 111, the first protruding pillar 1112 correspondingly passes through the first positioned hole 2112 of the first fastener 21 through the gripping portion 2111 so that the first fastener 21 can be attached on the base board 111. When the second fastener 22 is accommodated in the recess portion 1121, the second protruding pillar 1122 correspondingly passes through the second positioned hole 221 so that the second fastener 22 can be attached on the lateral wall 112. After assembling all surrounding members 20 on the electronic device 100, securing the front cover 12 to the back cover 11 correspondingly such that the front cover 12 is pressed against the second fastener 22 of the surrounding member 20 (step S05). Therefore, the surrounding member is assembled to the case of the electronic device.

Figure 12:
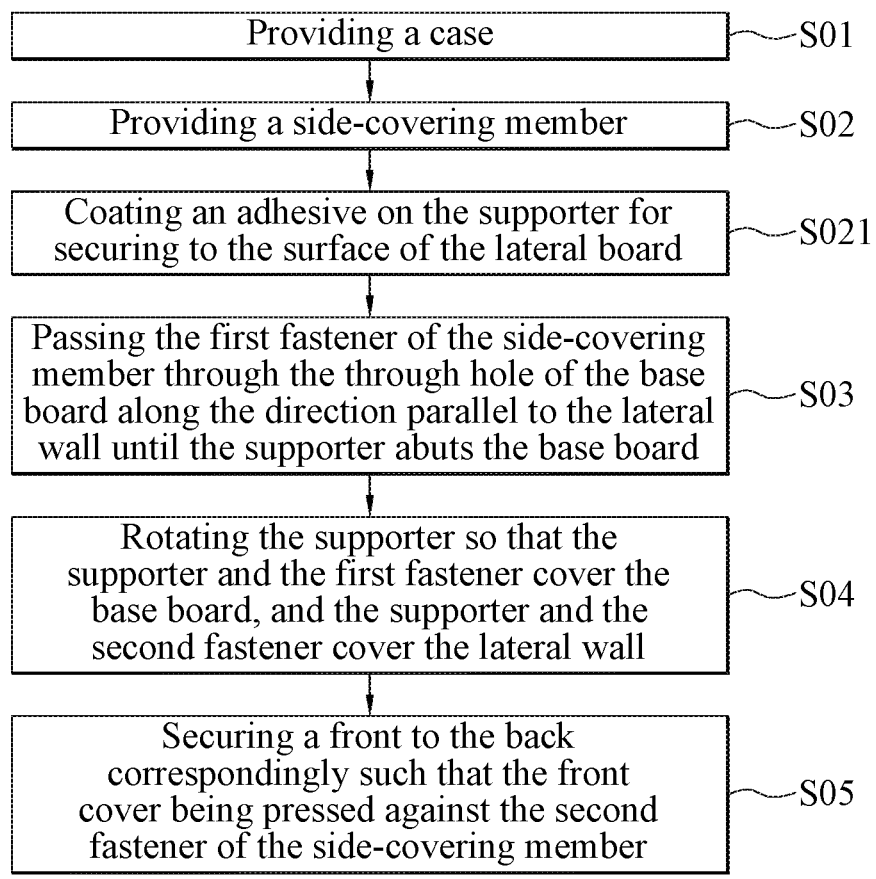
FIG. 12 is a flow chart illustrating a method of assembling a surrounding member with covering structure according to another embodiment of the instant disclosure.

In other embodiment, as shown in FIG. 12, FIG. 12 is a flow chart illustrating a method of assembling a surrounding member according to another embodiment of the instant disclosure. Except for the steps refer to the foregoing illustrated embodiment, in this embodiment, before passing the first fastener 21 of the surrounding member 20 through the through hole 1111 of the base board 111, an adhesive is coated on the surface of the supporter 23 which contacts with the lateral walls 112, namely, the first inner surface 232 and the second inner surface 233, in order to secure to the surface of the lateral wall 112 (step S201).

While the instant disclosure has been described by way of example and in terms of the preferred embodiments, it is to be understood that the invention needs not be limited to the disclosed embodiments. For anyone skilled in the art, various modifications and improvements within the spirit of the instant disclosure are covered under the scope of the instant disclosure. The covered scope of the instant disclosure is based on the appended claims.

What is claimed is:

1. An electronic device having a surrounding member with covering structure, comprising:
    a case comprising a back cover, the back cover comprising a base board and at least one lateral wall connected to the base board, the base board having at least one through hole near a joining region of the base board and the lateral wall; and
    at least one surrounding member with covering structure disposed on the case, the surrounding member with covering structure comprising a first fastener, a second fastener, and a supporter, the first fastener and the second fastener being respectively disposed on two ends of the supporter, wherein the first fastener passes through the through hole of the base board and is attached to the base board, the supporter and the first fastener cover the base board, and the supporter and the second fastener cover the lateral wall.

2. The electronic device having the surrounding member with covering structure of claim 1, wherein the lateral wall is perpendicular to the base board.

3. The electronic device having the surrounding member with covering structure of claim 1, wherein the lateral wall has at least one recess portion, the recess portion is corresponding to the through hole, and the second fastener is accommodated in the recess portion.

4. The electronic device having the surrounding member with covering structure of claim 1, wherein the supporter is L-shaped.

5. The electronic device having the surrounding member with covering structure of claim 1, wherein the first fastener and the second fastener extend out along the same direction from the supporter.

6. The electronic device having the surrounding member with covering structure of claim 1, wherein the first fastener comprises a restricting portion and a receiving portion, one end of the receiving portion is connected to the supporter, and another end of the receiving portion is connected to the restricting portion, the receiving portion is perpendicularly connected to a surface of the supporter, and the restricting portion is perpendicular to the receiving portion.

7. The electronic device having the surrounding member with covering structure of claim 6, wherein the restricting portion, the receiving portion, and the supporter form a covering groove to cover the base board.

8. The electronic device having the surrounding member with covering structure of claim 1, wherein the base board further comprises at least one first protruding pillar disposed near the through hole, the first fastener has at least one first positioned hole, and the first protruding pillar correspondingly passes through the first positioned hole.

9. The electronic device having the surrounding member with covering structure of claim 3, wherein the lateral wall further comprises at least one second protruding pillar disposed in the recess portion, the second fastener has at least one second positioned hole, and the second protruding pillar correspondingly passes through the second positioned hole.

10. The electronic device having the surrounding member with covering structure of claim 1, wherein the supporter comprises an arc-shaped supporting portion.

11. The electronic device having the surrounding member with covering structure of claim 1, wherein the surrounding member with covering structure comprises an adhesive disposed between the supporter and the lateral wall.

12. The electronic device having the surrounding member with covering structure of claim 1, wherein the case further comprises a front cover correspondingly secured on the back cover, the front cover is pressed against the second fastener of the surrounding member with covering structure.

13. A method of assembling a surrounding member with covering structure, comprising:
    providing a case, wherein the case comprises a back cover, the back cover comprises a base board and at least one lateral wall connected to the base board, the base board has a through hole near a joining region of the base board and the lateral wall;
    providing at least one surrounding member with covering structure, wherein the surrounding member with covering structure comprises a first fastener, a second fastener, and a supporter, the first fastener and the second fastener are disposed on supporter ends of the supporter;
    passing the first fastener of the surrounding member with covering structure through the through hole of the base board along the direction parallel to the lateral wall until the supporter abuts the base board;
    rotating the supporter so that the supporter and the first fastener cover the base board, and the supporter and the second fastener cover the lateral wall; and
    securing a front cover to the back cover correspondingly such that the front cover being pressed against the second fastener of the surrounding member with covering structure.

14. The method of claim 13, wherein the lateral wall has at least one recess portion, the recess portion is corresponding to the through hole, and the second fastener is accommodated in the recess portion.

15. The method of claim 13, wherein the supporter is L-shaped.

16. The method of claim 13, wherein the first fastener and the second fastener extend out along the same direction from the supporter.

17. The method of claim 13, wherein the base board further comprises at least one first protruding pillar disposed near the through hole, the first fastener has at least one first positioned hole, when rotating the supporter accompanied by the rotation of the first fastener, the first protruding pillar correspondingly passes through the first positioned hole.

18. The method of claim 14, wherein the lateral wall further comprises at least one second protruding pillar disposed in the recess portion, the second fastener has at least one second positioned hole, when rotating the supporter to attach the second fastener in the recess portion, the second protruding pillar correspondingly passes through the second positioned hole.

19. The method of claim 13, wherein before passing the first fastener of the surrounding member with covering structure through the through hole of the base board, coating an adhesive on the supporter for securing to a surface of the lateral wall.

20. A surrounding member with covering structure, comprising:
a supporter comprising a first inner surface and a second inner surface, the first inner surface being connected to the second inner surface;
a first fastener comprising a restricting portion and a receiving portion, one end of the receiving portion being connected to the first inner surface of the supporter, and another end of the receiving portion being connected to the restricting portion, and the restricting portion extending toward the direction away from the second inner surface; and
a second fastener disposed on the second inner surface of the supporter.

21. The surrounding member with covering structure of claim 20, wherein the supporter is L-shaped.

22. The surrounding member with covering structure of claim 20, wherein the first inner surface is perpendicular to the second inner surface.

23. The surrounding member with covering structure of claim 20, wherein the receiving portion is perpendicularly connected to the first inner surface of the supporter.

24. The surrounding member with covering structure of claim 20, wherein the second fastener is perpendicular to the second inner surface of the supporter.

25. The surrounding member with covering structure of claim 20, wherein the supporter further comprises an external surface defining a corner area having a curved contour.

26. The surrounding member with covering structure of claim 20, wherein the first fastener has at least one first positioned hole, and the second fastener has at least one second positioned hole.

27. The surrounding member with covering structure of claim 20, wherein the restricting portion, the receiving portion, and the supporter form a covering groove.

* * * * *